United States Patent
Rau et al.

(10) Patent No.: US 10,777,083 B2
(45) Date of Patent: Sep. 15, 2020

(54) DRIVING ASSISTANCE SYSTEMS AND METHODS

(71) Applicant: Sackett Solutions & Innovations, Houston, TX (US)

(72) Inventors: Nemoy Rau, Houston, TX (US); Esha Rau, Houston, TX (US); Hans Rau, Fishers, IN (US)

(73) Assignee: Sackett Solutions & Innovations, LLC, Houston, TX (US)

(*) Notice: Subject to any disclaimer, the term of this patent is extended or adjusted under 35 U.S.C. 154(b) by 0 days.

(21) Appl. No.: 16/230,472

(22) Filed: Dec. 21, 2018

(65) Prior Publication Data

US 2019/0130761 A1    May 2, 2019

Related U.S. Application Data

(62) Division of application No. 14/500,197, filed on Sep. 29, 2014, now Pat. No. 10,210,761.

(Continued)

(51) Int. Cl.

| | |
|---|---|
| *G08G 1/16* | (2006.01) |
| *G06K 9/00* | (2006.01) |
| *B60W 40/09* | (2012.01) |
| *B60R 1/072* | (2006.01) |
| *B60R 1/02* | (2006.01) |
| *B60R 11/04* | (2006.01) |

(Continued)

(52) U.S. Cl.
CPC ............... *G08G 1/167* (2013.01); *B60R 1/02* (2013.01); *B60R 1/025* (2013.01); *B60R 1/072* (2013.01); *B60R 1/081* (2013.01); *B60R 11/04* (2013.01); *B60W 40/09* (2013.01); *G06K 9/00791* (2013.01); *G06K 9/00845* (2013.01); *G08B 21/06* (2013.01); *G08G 1/056* (2013.01); *G08G 1/0965* (2013.01); *G08G 1/165* (2013.01); *G08G 1/166* (2013.01)

(58) Field of Classification Search
CPC ...... G08G 1/167; G08G 1/056; G08G 1/0965; G08G 1/65; G08G 1/166; B60W 40/09; G06K 9/00791; G06K 9/00845
USPC .......................................... 348/148
See application file for complete search history.

(56) References Cited

U.S. PATENT DOCUMENTS

| | | | |
|---|---|---|---|
| 2009/0256910 A1* | 10/2009 | Ganeshan ................ | G08G 1/04 348/148 |
| 2011/0169625 A1* | 7/2011 | James .................... | B60Q 9/008 340/439 |

(Continued)

Primary Examiner — Matthew K Kwan
(74) Attorney, Agent, or Firm — Hartman Global IP Law; Gary M. Hartman; Domenica N. S. Hartman

(57) ABSTRACT

Systems and methods for promoting safety during operation of a passenger vehicle. Such a system/method may determine positions of rear and sideview mirrors of a passenger vehicle that are optimized for a particular driver of the passenger vehicle to minimize "blind spots" based on the driver and the particular vehicle configuration, and for moving the rear and sideview mirrors into the optimized positions. Alternatively or in addition, such a system/method may collect data corresponding to internal and external conditions of the vehicle, optionally establish a driver profile of typical driving characteristics from the collected data, determine potential risks and/or hazards from the collected data, and warn the driver of the potential risks and/or hazards.

20 Claims, 12 Drawing Sheets

Related U.S. Application Data

(60) Provisional application No. 61/884,489, filed on Sep. 30, 2013.

(51) Int. Cl.
*G08B 21/06* (2006.01)
*B60R 1/08* (2006.01)
*G08G 1/056* (2006.01)
*G08G 1/0965* (2006.01)

(56) References Cited

U.S. PATENT DOCUMENTS

| | | | |
|---|---|---|---|
| 2012/0271484 A1* | 10/2012 | Feit | B60W 10/18 701/1 |
| 2013/0038732 A1* | 2/2013 | Waite | B60R 1/00 348/148 |
| 2013/0073114 A1* | 3/2013 | Nemat-Nasser | B60W 40/09 701/1 |

* cited by examiner

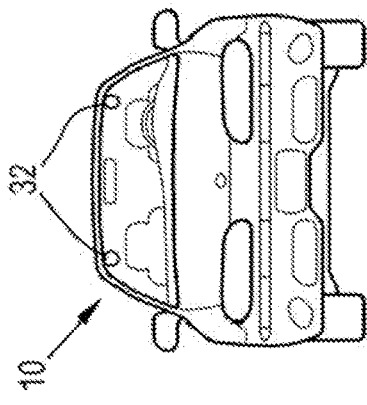
FIG. 4
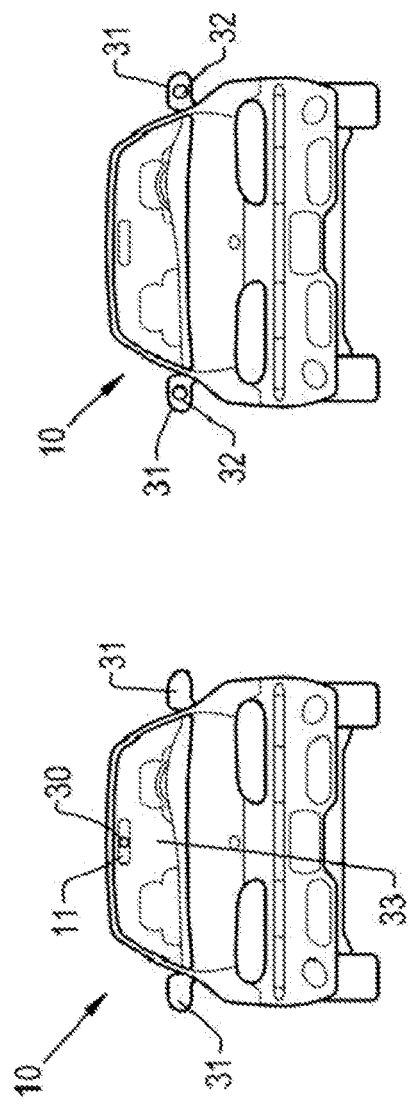
FIG. 5
FIG. 6
FIG. 7
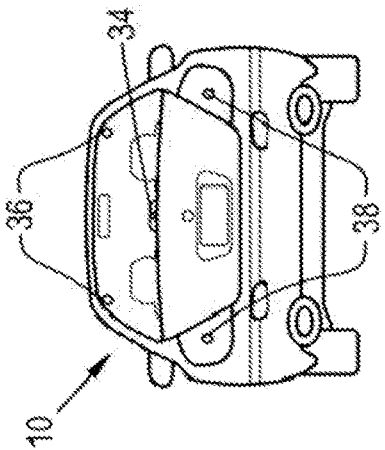
FIG. 8
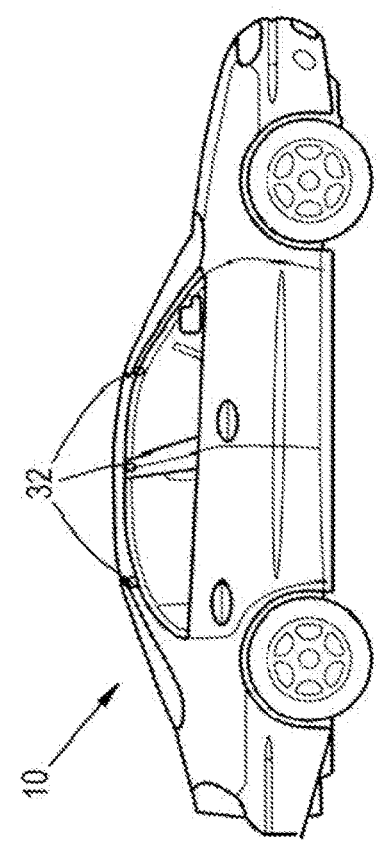

Table of Algorithms

| Algorithm | Inputs | Function |
|---|---|---|
| 1. OMP ALG (Optimum Mirrors Positioning Algorithm) | • Fixing driver's eyes and nostrils positions in a three-dimensional space by camera from the camera system DTFC 1<br>• Vehicle's shape, sizes A, B, C, D pillars and relative blind spots for driver's position<br>• Current position of inside mirror from MTDBC 2 | • Compute relative blind spots for original position of driver's eyes<br>• Compute optimum 3 mirrors positions<br>• Set the mirrors or assist driver with mirror setting |
| 2. MPD ALG (Mirrors Position Display Algorithm) | • Current mirrors positions<br>• Optimal mirror positions for a driver<br>• Blind spot computations mapping of blind spots for a given mirrors and driver's configurations | • Integrate with driver information display<br>• Driver learning / training to adapt to OPM ALG mirror positions incrementally over a period of time |
| 3. DIRA ALG (Driver Impairment Risk Analysis Algorithm) | • Camera system DTFC1 tracking of eyes, nostrils, MTDBC 2 tracking of head and driver view from back<br>• Compute and match to diagnose impairment and severity risks<br>• MRMFC 3 and other camera systems information on the weather, traffic, speed, etc.<br>• Driver history database DPHD | • Impairment identification and risk analysis<br>• Curtains and warnings both graphical and voice modes |

FIG. 9A

| | | |
|---|---|---|
| 4. EVS ALG (Emergency Vehicle Stoppage Algorithm) | • DIRA ALG risk analysis<br>• MRMFC 3, RTFC 4 & RTBC 5 information to assess emergency vehicle steering and stopping methodology and risks | • Activate emergency lights, communicate location to emergency response contact systems (e.g. dialing 911 in USA) from cell phone of driver<br>• Steer the vehicle gradual slowing down, move to shoulder and park |
| 5. DRAI ALG (Distraction Risk Analysis and Intervention Algorithm) | • Dynamic information from DTFC 1, MTDBC 2<br>• Pattern recognition from DPHD database information | • Identify distraction type and assess the risk from that distraction<br>• Issue caution and warning messages accordingly<br>• Save the records of behavior and integrate with DPHD |
| 6. CDIS ALG (Customized Dynamic Interactive Safety Algorithm) | • Dynamic information from MRMFC 3, RTFC 4 and RTBC 5<br>• Traffic density, weather, speed and road type information<br>• Driver's driving pattern deviations<br>• Driver's overrides on driving conditions and weather | • Monitor driving match with pattern of driving for a given combination of external variables and assess the deviations<br>• Issue cautions and warning messages to reduce the risks potential<br>• Update VSSTDM database |
| 7. RHIW ALG (Road Hazard Identification and Warning Algorithm) | • Dynamic information from MRMFC 3, RTFC 4, and RTBC 5<br>• Track and identify by matching with a library of stored data, different types of potential hazards | • Issue necessary caution and warning messages |

FIG. 9B

Interdependency and Integration

DRIVING ASSISTANCE SYSTEMS AND METHODS

CROSS REFERENCE TO RELATED APPLICATIONS

This is a division application of U.S. patent application Ser. No. 14/500,197 filed Sep. 29, 2014, which claims the benefit of U.S. Provisional Application No. 61/884,489 filed Sep. 30, 2013. The contents of these prior patent applications are incorporated herein by reference.

BACKGROUND OF THE INVENTION

The present invention generally relates to driver-operated vehicles. More particularly, this invention relates to methods and systems suitable for supplying driving assistance to a driver of a vehicle, for example, dynamic driving assistance and warnings, to improve safety during operation of a passenger vehicle.

Since the introduction and popularization of motorized passenger vehicles (automobiles) to the general public, there has been an interest in automating their operation and removing the need for human control. As early as 1920, remote radio controlled "phantom motor cars" were developed and showcased as the future of automobile transportation. More recently, a variety of both military and commercial projects have been undertaken to build and improve automated vehicle programs. At the time of this writing, several automobile manufacturers produce varying degrees of automation in their models, including adaptive cruise control, lane assist (determining the lateral distance between vehicles in adjacent lanes) and parking assist. Some passenger vehicles are now capable of fully automated parking. Many manufacturers expect to produce and bring to market completely automated passenger vehicles within the next ten years.

A large number of issues pertaining to automated vehicles remain unresolved. How these automated vehicles are introduced and integrated into the larger public traffic system remains mostly untested on a large scale. In addition, very little legislation has been put into effect to prepare for or accommodate automated vehicles. What has been enacted and drafted has been on a state-to-state basis, and typically simply defines what automated vehicles are, and directs the government to further develop regulations pertaining to them.

As research into vehicle automation has progressed, a variety of driving assistance systems have been produced and introduced. These include vehicle navigation, for example, GPS, adaptive cruise control, lane change assistance, collision avoidance systems, night vision, adaptive light control, parking assistance, blind spot detection, and driver drowsiness detection. Some or all of these features could be integrated into an automated vehicle. These driving assistance technologies are useful in their own right, and are very beneficial to driver awareness and safety. They are and will continue to be employed as standalone technologies without full vehicle automation. However, these technologies are often not used to their full potential, and are simply single features added to vehicles. A method or system of integrating these technologies could foreseeably greatly increase their effectiveness.

The largest source of vehicle accidents is human error. While full vehicle automation is one possible solution to this, its widespread integration and implementation is still in the future. In the meantime, there is a need for greater and more comprehensive methods of reducing human error as a factor in vehicle accidents. Many technologies are in place that can improve various aspects of driver safety, however, they are not used to their full potential as both part of an integrated system and as a system individually tailored to a specific or individual driver of a particular vehicle.

BRIEF DESCRIPTION OF THE INVENTION

The present invention provides methods and systems suitable for supplying driving assistance to drivers of passenger vehicles, which, as used herein, will broadly refer to vehicles having a passenger compartment configured to be occupied by at least the driver of the vehicle.

A particular but nonlimiting embodiment within the scope of the invention is a system and/or method that includes algorithms intended to determine optimum settings for rear and sideview mirrors to minimize driver blind spots based on the driver and the vehicle configuration. In preferred embodiments, such a system/method includes a data collection system that detects and records a driver seat position of the passenger vehicle, body and face positions of a driver of the passenger vehicle while seated in the driver seat, and preliminary positions of the rear and sideview mirrors, an algorithm to determine positions of the rear and sideview mirrors to reduce blind spots and increase driver visual awareness of the driver while seated in the driver seat, means for the driver to initiate the system, and means for moving the rear and sideview mirrors to the determined positions thereof as a result of the driver initiating the system.

Another particular but nonlimiting embodiment within the scope of the invention is a system and/or method that includes collecting data corresponding to internal and external conditions of the vehicle, processing the collected data to determine useful and/or pertinent data thereof, establishing a driver profile of typical driving characteristics from the collected data, determining potential risks and/or hazards from the collected data, and warning the driver of the potential risks and/or hazards determined from the collected data.

Yet another particular but nonlimiting embodiment within the scope of the invention is a system and/or method that includes a data collection system that collects data corresponding to both internal and external conditions of the vehicle, a processing system that utilizes algorithms for processing the collected data to create a history database of the collected data as well as to process the collected data and determine risk factors therefrom, and a relay system that utilizes the history database to relay potential risks to the driver of the vehicle through physical, audio and/or visual alerts.

Systems and methods of the types described above are intended to enhance driver safety and operating ability by monitoring various factors, for example, external factors such as environmental dangers and blind spot risks external to the passenger compartment, as well as internal factors, for example, driver impairment due to fatigue or distraction within the passenger compartment. Such systems and methods preferably utilize machine learning algorithms that, in some embodiments, constantly observe the driver and allow the system to develop a profile for the driver, which may include a baseline driving technique and ability metric. With this approach, over time the system can analyze the performance of the driver, compare the driver's performance to the driving profile developed by the system for the driver, and then determine whether the drive may be impaired or distracted.

Certain embodiments of the systems/methods preferably integrate data from different sources, including eye tracking technologies, Laser Interferometry Detection and Ranging (LIDAR), weather and road conditions, vehicle static and dynamic measurements, and/or driver behavioral measurements. Any or all of these factors may be applied so that the system can provide an appropriate response to aid the driver and improve safety.

In view of the foregoing, methods and systems of this invention are adapted to supply driving assistance to a driver, and preferably make use of integrated software and hardware. Such hardware can comprise various analytical and observational tools, for example, sophisticated camera assemblies, capable of determining the present condition of the vehicle, the surrounding environment, and/or the driver. The software can be built on a series of algorithms that identify risks as recorded by the observational tools and, in some embodiments, create a driver performance history and/or gauge and classify risks as recorded by the observational tools. The software may also be capable of creating an appropriate response using these algorithms and safety features, for example, steering and speed correction already in place in the vehicle or included as part of the system itself. The invention could also encompass methods for integrating similar systems and algorithms for the purpose of reducing driver risk in vehicles.

A technical effect of the invention is the ability to assist drivers of various levels of skill. For example, by identifying and achieving optimum settings for rear and sideview mirrors, the system is able to minimize driver blind spots based on internal factors (e.g., physical characteristics of the drive and other driver-related sources, configuration of the passenger compartment, etc.) and external factors (e.g., vehicle configuration). As another example, by combining the compiled driving history of each driver of a vehicle equipped with the system, the system can assess and classify sources of risks, including both external and environmental sources as well as interior and driver-related sources. This information can be used to develop driver-specific and vehicle-specific general risk potentials and generate appropriate warnings for a driver as needed. In this role, the system can serve as an extra, comprehensive set of eyes and ears for a driver to improve driver awareness with the goal of improving safety and reducing risk.

From the above, it should be apparent that systems and methods of this invention are not specifically intended to replace or marginalize the human aspect of driving. Instead, the systems/methods are intended to capture certain characteristics and/or patterns of the driver, and are intended to work in coordination with these characteristics and patterns to improve the driver's ability to avoid obstacles and potential dangers and to enhance the driver's natural driving performance. The systems/methods may be further configured, when feasible and equipped to its full functionality, to perform corrective actions when integrated with other safety systems the vehicle may have, for example, corrective steering, accelerating, decelerating, and possibly overriding driver commands to avoid collisions or accidents. These technologies are already present in current automated vehicle technologies, and the system is designed with open programming architecture to allow easy integration with said technologies. As such, hardware and software components of the system can be configured to be integrated into Original Equipment Manufacturer's (OEM) systems and/or as an After Market Installation (AMI) as a standalone system.

Other objects and advantages of this invention will be better appreciated from the following detailed description.

BRIEF DESCRIPTION OF THE DRAWINGS

FIG. 4 represents examples of locations for a Motorized Inside Rearview Mirror Assembly with Front Facing Camera subsystem 3 (MRMFC3) that can be used within a driving assistance system in accordance with an embodiment of the present invention.

FIGS. 5, 6, and 7 represent examples of locations for a Road Tracking Front Camera subsystem 4 (RTFC4) that can be used within a driving assistance system in accordance with an embodiment of the present invention.

FIG. 8 represents examples of locations for a Road Tracking Back Camera subsystem 5 (RTBC5) that can be used within a driving assistance system in accordance with an embodiment of the present invention.

FIGS. 9A and 9B contain a table listing certain algorithms that may be employed with the invention, as well as their inputs and functions.

DETAILED DESCRIPTION OF THE INVENTION

Figure 1:
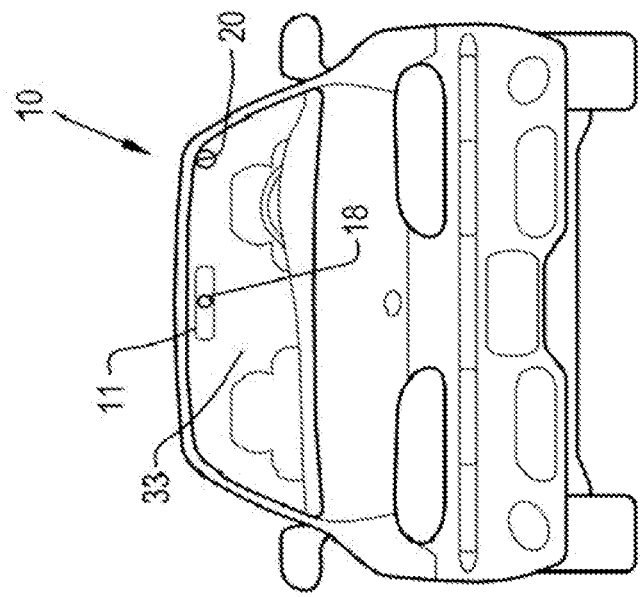
FIG. 1 represents examples of locations for a Driver Tracking Front Camera subsystem 1 (DTFC1) that can be used within a driving assistance system in accordance with an embodiment of the present invention.

The invention is directed to systems and methods capable of providing driving assistance to a driver of a passenger vehicle for the purpose of improving driver safety. Such systems and methods may entail promoting driver awareness, for example, by minimizing vehicle blind spots and/or monitoring driver attentiveness and impairment, and/or by suggesting or making adjustments to the vehicle and/or changes in traffic and environmental conditions. The systems and methods preferably integrate a variety of analytical and monitoring technologies and algorithms to provide appropriate responses capable of promoting or enabling driver awareness or performance.

Preferred embodiments of the invention are referred to as driving assistance systems and use a data collection system that collects data corresponding to internal conditions (i.e., within the passenger compartment) and preferably also external conditions of the vehicle, and further use a processing system (for example, an on-vehicle or remote computer) that utilizes algorithms for processing the collected data. Certain embodiments will be more particularly referred to as dynamic driving assistance and warning systems, and further use the processing system to process the collected data to create a history database of the collected data and/or determine risk factors therefrom, and further have a relay system that utilizes the history database to relay potential risks to the driver of the vehicle through physical, audio and/or visual alerts.

The data collection system preferably comprises several camera subsystems corresponding to various areas of the exterior and interior of the vehicle. Any of the camera subsystems can include more than one camera integrated together, optionally using more than one camera type, to function as a cohesive system. The cameras may use different sensing technologies, including complementary metal-oxide semiconductor (CMOS) devices, charge-coupled devices (CCD), LIDAR (combined laser and radar; also written LiDAR) sensors (to measure distances), system on chip (SOC), or other electronic technologies. The cameras preferably collect imaging data and, optionally with data associated with operating parameters available from other on-board systems of the vehicle, are outputted to the processing system where algorithms are utilized to process the collected data.

The cameras preferably comply with standards set for cameras intended for use in automobile applications with regards to certain factors, for example, low light and IR sensitivity, frame rates, and temperature ranges. Various camera subsystems may be used, depending on the intent of the system. For example, certain camera subsystems are primarily intended for use to minimize vehicle blind spots and/or monitor driver attentiveness and impairment. As another example, certain camera subsystems are primarily intended for use with the dynamic driving assistance and warning system with regards to their usage, primarily, the identification and tracking of moving objects in a dynamic background, and the processing system thereof preferably utilizes algorithms to provide object tracking data, compensate for different lighting and weather conditions, etc. In a particular embodiment envisioned for the invention, there are preferably five major camera subsystems, although more or less could be used to improve the functionality or efficiency of the overall system. These camera subsystems are discussed immediately below.

Figure 2:
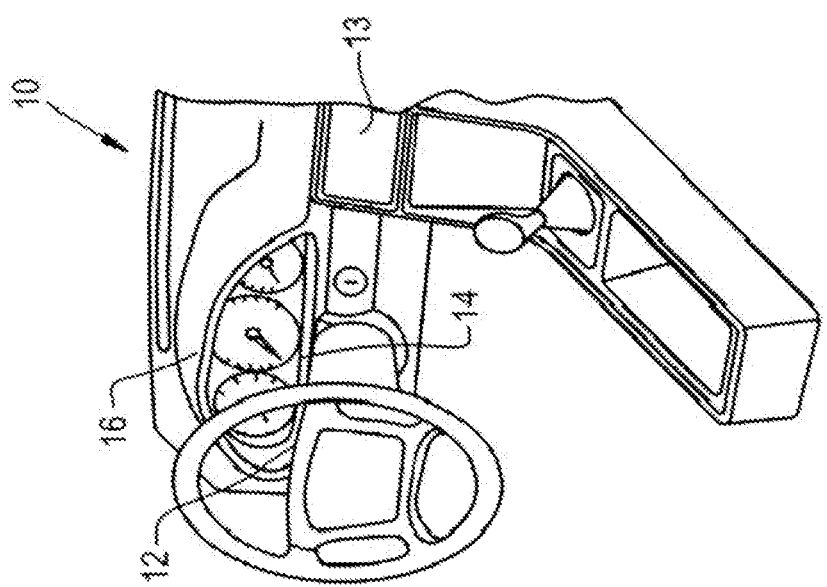
FIGS. 2 and 3 represent examples of locations for a Mirror Tracking and Driver's Back View Camera subsystem 2 (MTCBC2) that can be used within a driving assistance system in accordance with an embodiment of the present invention.

A camera subsystem referred to herein as a Driver Tracking Front Camera subsystem 1 (DTFC1) (see FIG. 1) tracks the driver of a vehicle 10 and the driver's movements and features. These movements and features may include eyes, pupils, eye focus direction, eyelids, eye flutter, nostrils, head movement, and facial changes. These features are desirable to monitor because they relate to a driver's view or focus on the road, and can also indicate impairment or distraction. The DTFC1 possibly includes two to four cameras. At least one camera preferably focuses on facial details of the driver to collect images thereof. In some embodiments, at least one other camera preferably includes the head body and hands of the driver to collect images thereof. A microphone can be optionally utilized to obtain audio recordings as an additional subcomponent of the DTFC1. As represented in FIG. 1, cameras for the DTFC1 can located in various different locations, depending on the vehicle design. For example, FIG. 1 depicts suitable locations as including the steering column 12 behind the steering wheel of the vehicle 10, inside the instrument cluster 14, and/or on the dashboard 16 directed toward the driver's face and head height regions. Other possible locations include, but are not limited to, the top of the front windshield near the roofline directed at driver face height, or at a slight angle directed to driver's head height and fixed above front inside rearview mirror (11 in FIG. 2).

Figure 3:
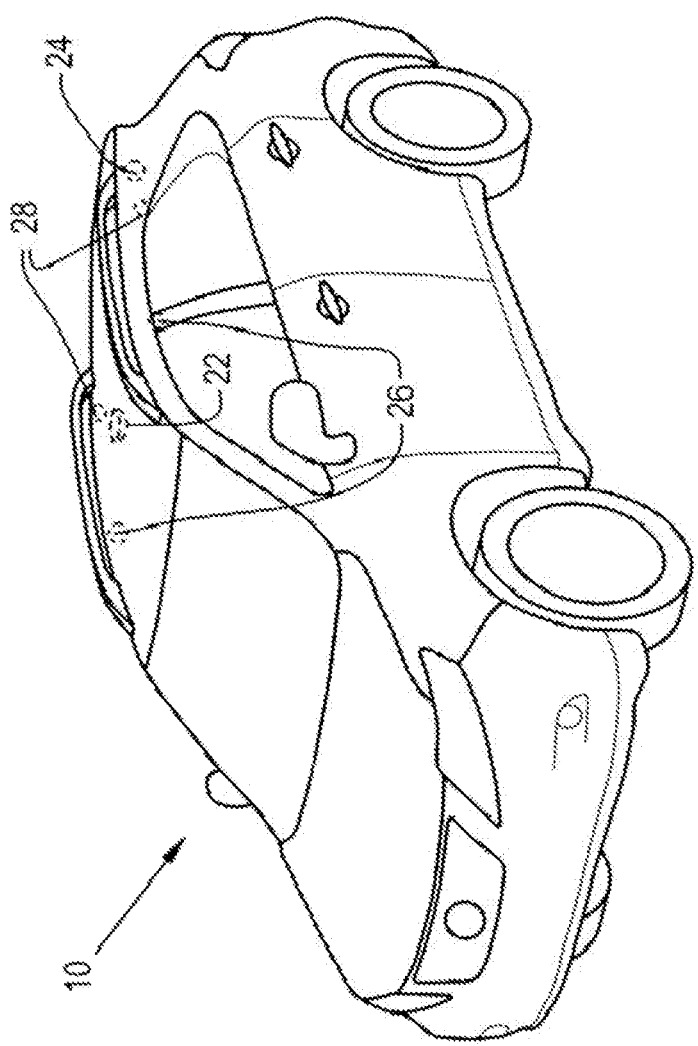

A camera subsystem referred to herein as a Mirror Tracking and Driver's Back View Camera subsystem 2 (MTDBC2) utilizes multiple cameras and focuses on the rearview capabilities of the driver and preferably includes at least two different camera types. As represented in FIG. 1, at least one camera (or camera unit) 18 preferably focuses on the inside rearview mirror 11, and assists in both initial mirror settings and adjustments as needed due to change in driver posture or user overrides. At least a second camera (or camera unit) 20 preferably captures a larger view of the back and/or side of the vehicle 10, and could possibly be used to also track the driver's movements. The MTDBC2 camera subsystem will largely depend on the vehicle design and possible interior obstructions. As such, FIG. 3 represents additional or alternative camera locations as including interior dome light 22, the top inside center position of the rear windshield 24 (may also be in conjunction with a break light at this location, if that light is already positioned there), or near the top of the passenger side B or C pillars 26 or 28 to provide a good view of the driver (cameras aligned vertically one over the other if the pillar dimensions pose limitations).

A camera subsystem referred to herein as a Motorized Inside Rearview Mirror Assembly with Front Facing Camera 3 (MRMFC3) preferably includes a four-way motor control built into the rearview mirror 11 of the vehicle 10 and adapted to automatically set the rearview mirror position using information relating to driver posture and viewing ability obtained from the DTFC1 and MTDBC2 subsystems with the use of an appropriate computer program. As represented in FIG. 4, at least one camera of the MRMFC3 is preferably integrated with the review mirror 11, for example, the camera may be located inside the rearview mirror 11. An optional information display screen (e.g., LED/LCD) 13 (FIG. 1) located within the passenger compartment of the vehicle 10 can be used to display the contour of the rearview mirror position that was automatically set with the motor control and save this position to fix a position of the rearview mirror 11 in a portion of the history database associated with the driver. The information display screen 13 can optionally serve to also display information provided by other of the camera subsystems and to program mirrors (for example, the rearview mirror 11 and/or sideview mirrors 31) for certain viewing options. Preferably, the driver can override the automatically set position of the mirror 11, for example, manually or with a four-way control button system. Accordingly, the rearview mirror 11 can be positioned either automatically or manually, i.e., consistent with or in lieu of recommendations generated by the processing system. The rearview mirror 11 may also contain front facing cameras to determine distances of objects in front of the vehicle 10, both moving and stationary, as well as lane markings and other useful factors, for example, emergency vehicle lights, weather conditions, etc.

The MRMFC3 subsystem can also include one or more front-facing cameras mounted above and around the front windshield 33. The MRMFC3 camera(s) can be primarily used to determine the vehicle's deviation from the center of the lane, as well as environmental factors, for example, lighting and weather. Such information can be obtained with the MRMFC3 camera(s) alone or in combination with one or more additional sets of front-facing cameras, for example, mounted in the outside sideview mirrors 31 of the vehicle 10, or on the 'A' pillars inside the windshield top (as will described below in reference to an RTFC4 subsystem). The information obtained with the MRMFC3 camera(s) can be coordinated with other vehicle information, for example, integrated with steering system information, vehicle speed, environmental ambient conditions, etc., as may be desired or necessary. Information regarding ambient conditions may include, for example, outside temperatures, wipers on or off, speed of wiper strokes, headlights on or off, precipitation (rain, snow, or variations of sleet or freezing rain) and variations in sensed intensity levels between the MRMFC3 camera(s) and/or other camera subsystems, variations in outside ambient light conditions detected within the images obtained with the cameras, etc. This information can be used to further develop the history database with data relating to the driver's driving patterns and performance.

A camera subsystem represented in FIGS. 5, 6 and 7 is referred to herein as a Road Tracking Front Camera subsystem 4 (RTFC4), and preferably has two configurations, although additional configurations could be used to address its main functionality. In one configuration, cameras of the RTFC4 subsystem may be placed on both sides of the vehicle 10, for example, within the housings of the sideview mirrors 31 (FIG. 5) or within the 'A' pillars at the upper windshield corners (FIG. 6). Alternatively or in addition, the cameras of the RTFC4 subsystem can be used with at least one set of cameras capturing forward views ahead of the vehicle 10 and another set of cameras capturing rearward views behind the vehicle 10. These camera units may be located in the driver-side sideview mirror (also referred to as the driver-side outside mirror, or DOM) 31 and the passenger-side sideview mirror (also referred to as the outside curved mirror, or POCM) 31. In certain instances, cameras of the RTFC4 subsystem may alternatively or also be located on both sides on the roof of the vehicle 10, for example, at the A, B or C pillars as represented in FIG. 7. In any case, the RTFC4 subsystem comprises cameras facing forward of the vehicle 10. This system captures stationary objects, for example, road debris and other hazards, animals, stationary emergency vehicles, etc. The RTFC4 subsystem is preferably capable of capturing light in a variety of ambient conditions. Possibly, the RTFC4 subsystem could further include cameras facing rearward of the vehicle 10 to capture data in that direction.

FIG. 8 represents a camera subsystem referred to herein as a Road Tracking Back Camera subsystem 5 (RTBC5), and comprises cameras facing the back of the vehicle 10 to capture the distant view of moving objects on both sides of multi-lane highways or two-lane roads. This system is preferably used to primarily track aggressive, erratic, or impaired drivers behind the vehicle 10. Possible locations for the RTBC5 cameras include inside the vehicle 10 and facing rearward on both sides of a center high mounted stop lamp (known as CHMSL or top rear brake light) 34, and/or outside the vehicle 10 at or near the upper corners on the vehicle's rear windshield 36, and/or as a part of the rear signal and brake light assemblies 38.

All or some of the camera subsystems described above can be used by the processing system to improve general awareness for the driver. The camera subsystems can be integrated into the processing system, whose algorithms sift through the data generated by one or more of the camera subsystems for useful information and deliver the information to the driver and, if necessary, provide corrective control over the vehicle 10 if the driver has not yet or fails to take an appropriate action.

The processing system's use of algorithms can be broadly categorized into distinct functions. FIGS. 9A and 9B contain a comprehensive overview of seven algorithms that are preferably utilized. FIGS. 9A and 9B list the inputs to the algorithms, including camera systems, and functions. Each algorithm will be discussed in more detail below. Broadly, the algorithms listed in FIGS. 9A and 9B can be categorized into three sets of algorithms. One set of algorithms collects data directed to the optimization of the driver's vision, and in particular the mirrors of the vehicle. Another set of algorithms collects data pertaining to the driver's characteristic driving patterns, skills in relation to challenging driving conditions including weather, traffic, visibility, emergency corrections, etc. This data is then processed to determine certain safety thresholds and other characteristic benchmarks that the system can use to determine the driver's impairment and/or focus at a given moment and compensate accordingly. Another set of algorithms collects the data from one or more of the various camera subsystems. These data are integrated into the system to determine how the present situation corresponds with known driving patterns for the given situation, and how the processing system can better assist the driver.

The system primarily functions as a driving assistance tool. That is, its main functionality is to reduce one or more risks relating to the driver's operation of the vehicle 10, and optionally to make the driver aware of multiple possible risks, both external, for example, traffic or weather, and internal, for example, driver fatigue and distraction. To that end, the system may include the capability of warning the driver, for example, making sounds and/or voice methods. These warnings can vary in volume and sound depending on the urgency of the situation.

In a particular embodiment, collected data can be processed and used to improve the use of conventional safety features, for example, mirrors (e.g., 11 and 31 in FIGS. 1 through 8). For example, the data collected with respect to the positioning of the rearview mirror can determine how best to angle the mirror, depending on the location of the driver's head and eyes. The driver assistance system can then physically move the rearview mirror to better accommodate the driver.

The various algorithms will be described in detail. The first of these will be described as assisting the driver in obtaining optimal positions of the rear and sideview mirrors 11 and 31, and may use incremental learning to adapt for optimal mirror settings. The camera system DTFC1 and inside mirror system MRMFC3 are preferably used for this sub-system. It may possibly be linked to the information display screen 13. The system is involved with the positioning of the rear and sideview mirrors 11 and 31, and is integrated with the system that allows the driver to manually change mirror and seat positions. It may also recognize regular drivers and their corresponding settings, and forward this information on to other systems in order to access the corresponding driver history database. The driver can activate a button, or possibly some other trigger, for example, an individual-specific key fob, to save the mirror and seat positions in a memory system, so that these positions can be recalled at a later time, and also so that another driver can save a different set of positions in the same car without overwriting the original driver's settings.

To begin the initial system algorithms, the driver adjusts the seat to a comfortable position, as well as grip the steering wheel and look forward, or in a position they would be in while driving normally. The driver initiates the program by pushing a button, or possibly some other method of activation, and waiting in a standard driving posture while the DTFC1 system then captures both the eyes and nostril positions. After this information is captured, an algorithm "Optimal Mirrors Positioning Algorithm" (OMP ALG) (see FIGS. 9A and 9B) computes the optimal position of first the inside rearview mirror 11 and then the sideview mirrors 31. The mirrors 11 and 31 are moved to this position. This system can be implemented fully automatically or as a driver-assisted system. The system may include a control mechanism which would allow the user to either manually control the positions of the rear and sideview mirrors 11 and 31, similar to the mirror control switch commonly found in modern cars, or to automatically use the algorithm to determine the optimal location for each mirror using the algorithm. This function can possibly be used with each mirror independently or all three in sync. Additionally, the positions of the mirrors 11 and 31 may be displayed electronically somewhere visible to the driver, for example, with the information display screen 13. Additionally, changes in driver positions while driving can be accommodated by the invention, as the optimal positions can be recalculated. Possibly, an audio prompt may ask the driver if the system should reconfigure the mirrors 11 and 31 to accommodate the new posture.

Some drivers may not be comfortable driving with mirror positions automatically set by computer algorithms. In addition, many drivers perform better with mirrors they set themselves, though the mirror-setting process is time-consuming and repetitive, and the mirror settings may not be optimal. Therefore, a system is included in this invention to accommodate this, as well as gradually change the settings the driver uses to a more optimal position. First, the driver can save any mirror settings, whether set manually by the driver or automatically by the algorithm. The system may also display blind spots that the mirror setting leaves unresolved, providing greater awareness to the driver. In addition, this invention facilitates an incremental approach to changing the driver's mirror settings. By gradually changing the mirrors 11 and 31 to minimize blind spots, from the driver's typical setting to the optimal setting, the system can train the driver to make better use of mirrors 11 and 31 and accommodate the optimal settings. As stated before, the positions of the mirrors 11 and 31 as well as the positions of the blind spots can be displayed to the driver, using the Mirror Position Display Algorithm (MPD ALG) which links the data to, for example, the information display screen 13. This data can also be saved specifically to each driver. The system is a feedback loop, in that the MPD algorithm determines the optimal mirror positions, correlates this to the driver's preferred settings. The system either displays the blind spots of the current mirror settings, and expects the driver to change their own settings, or slightly moves the mirrors 11 and 31 to a better setting. This change is incremental, in that the mirrors 11 and 31 do not move while the car is in operation, but each time the driver initiates the program the mirrors 11 and 31 are moved more closely to the optimal position.

Embodiments may further include a safety enhancing system that operates by tracking drivers' impairments and distractive actions and evaluating risk from comparisons with the driver's customized profile history. Two sets of cameras, DTFC1 and MTDBC2 are preferably used to track driver's eyes, face, back and activities that keep the focus away from the road beyond short and safe intervals. A set of algorithms is used to process this data and integrate it with different types of information generated and consolidated from past driving histories to develop a driver profile. Driver risks can include distractions while driving, fatigue, cell phone use, or improper driving procedure. In each case, the system attempts to warn the driver of the infraction and recommend corrective action.

Several modules are preferably used within this system. The first of these uses the Driver Impairment Risk Analysis Algorithm (DIRA ALG) (see FIGS. 9A and 9B). This algorithm is initiated each time the vehicle (e.g., 10 in FIGS. 1 through 8) is started. It tracks data on eye movement and other information captured by the DTFC1 and MTDBC2 cameras. It utilizes different elements of eye tracking to identify risk levels, including distance between eyelids, eye focus shifting and blinking, eye focus only intermittently brought back to normal driving position, etc. It compares this data to the driver's profile and assesses the risk, and provides a warning to the driver, for example, an audible and/or visual indication (e.g., the information display screen 13), and such warnings can increase in frequency and intensity as indications of impairment increase. In emergencies, this module may activate the Emergency Vehicle Stoppage Algorithm (EVS ALG) (see FIGS. 9A and 9B), which is designed to function in high risk emergency situations, such as driver incapacitation in which the driver's face and head are removed from the position required for safe driving and also when the system has not received the override response from the driver. Loud warning signs are initiated, including visual, audio, and physical warnings. If no response from the driver is received, the vehicle 10 may slow down to a stop and activate emergency lights and other possible measure as necessary. Exterior cameras may indicate an appropriate place to stop the vehicle. GPS systems as well as emergency alert systems to emergency responders may be activated as well.

A third module is the Driver Voluntary and Non-Voluntary Distractions module. It uses the Distractions Risk Analysis and Intervention Algorithm (DRAI ALG) (see FIGS. 9A and 9B), which uses inputs from DTFC1, MTDBC2, and DPHD database information. Specifically, the module makes use of pupil and nostril tracking cameras to determine if the driver is distracted. It monitors the length of time the driver spends looking at the road, how often direction or speed changes are made, distances from lane markings, as well as external factors, for example, time of day and weather conditions. It compares these observations to the database compiled for each driver to determine inconsistencies. The database accessed depends on the driver. For new drivers, the database is composed of the average values of other driver profiles (possibly compiled by the system or vehicle manufacturer). This information is conveyed to the driver either through graphs on the information display screen 13 or through other possible means. The intention of this module is to make both the driver and passengers aware of unsafe driving behavior. If more dangerous behavior is displayed, the system may alert the driver to this through some warning.

The invention is preferably configured to discern a distinction between impairment and distraction. Distractions are often caused by a driver's interaction with electronic devices, including cell phones or even the radio. The invention takes into account distractions that require hand movement, as well as distractions caused by hands-free devices. The camera system DTFC1 and the algorithm DRIA ALG sense driver pupil changes to determine if and for how long a driver's focus is away from the road. The system can detect distraction either as one long deviation of attention from the road, or as a series of short deviations that may be detected at a high frequency over a short amount of time. If these indications occur, the system can warn the driver of their own distraction, as well as a passenger who can then encourage the driver to practice better driving behavior. Even if a distraction is not caused by an electronic device, the system can infer that a distraction exists, for example, a distraction caused by other passengers, possibly children. As the severity of these distractions increase, so too does the severity of the warnings. Suitable warnings include but are not limited to audible and visual warnings, for example, displayed on the information display screen 13.

A possible further use for the Driver Voluntary and Non-Voluntary Distractions module is associated with insurance companies. This DRAI algorithm can be used to monitor and assess risks associated with operator fatigue, drowsiness, and short periods of sleep while driving. The information recorded by this module can be conveyed to the driver's or vehicle's insurance company to be indicative of poor driving behavior and therefore a greater possible threat of an accident, as well as provide incentives to drivers who do not display poor driving behavior. Risks related to texting, using smart phone applications, long-duration cell phone conversations, or other activities are measurable, and therefore are available for management by the insurance company. The insurance company can shift the potential liability to the car owner if they are determined to have caused an accident while using a cell phone or similar device irresponsibly. The use of the Driver Voluntary and Non-Voluntary Distractions module can be extended with other variations to both personal and commercial vehicle operators. Alternatively or in addition, the module can be used as an educational tool for civilians as well as commercial truck drivers, bus drivers, train drivers, or even aircraft pilots. Finally, the module can be used to monitor operator performance and safety qualifications. The module may be connected to a microphone to record activity during periods of distraction, for use in the system's own driver history, as well as for use by insurance companies, law enforcement agencies, or parents.

Driver inability is also one of the problems covered by this invention. The invention is designed to also assist those who may suffer from poor reflexes or vision to deal with challenging driving conditions, for example, traffic density, road conditions, and weather. The algorithm Customized Dynamic Interactive Safety (CDIS ALG) (see FIGS. 9A and 9B) operates continuously while the vehicle engine is on. It tracks parameters, for example, traffic density, road classification (highway, street, etc.), road surface conditions (ice, water), visibility and temperature changes, and speed of the vehicle.

The algorithm functions using information from the MRMFC3, RTFC4, and RTBC5 camera systems. As these camera systems may not be adequate to always discern certain conditions, for example, rain or snow, the system may prompt the user to provide confirmation for absent or existing conditions. Therefore, the system has an advantage in that it includes the added benefit of the driver's input and subjective decision whether or not to use the feature. This information is used to determine safe vehicle speed and communicate to the driver other possible actions to improve vehicle safety.

One possible example of a configuration of various factors for determining driver and vehicle safety is as follows:
  a. Driver Attentiveness: High, Good, Moderate, Low, Impaired; (5 degrees of separation and use of DTFC 1 and MTDBC2 camera systems).
  b. Visibility: This feature has 2 dimensions. First dimension is 5 degrees of separation, namely: Excellent, Fair, Moderate, Bad, Terrible; and the Second dimension is the changes in current visibility conditions with 3 degrees of separation as: Holding with no major change, Improving, and Deteriorating.
  c. Traffic Flow and Density: Very low, Low, Moderate, Medium, Heavy, Very heavy and Slow, Stalled or crawling (7 degrees of separation and use of MRMFC3, RTFC4 and RTBC5 camera systems).
  d. Road type: 2 or 3 lane with opposite lanes traffic with no median or separation, 4 lane traffic with or without a median, Multi-lane city, Multi-lane state, Interstate highway (5 degrees of separation and use of MRMFC3, RTFC4 and RTBC5 camera systems).
  e. Road surface risk: Dry and good, Wet and good, Wet and puddles of water—hydroplaning risk at higher speeds, Flowing or deep water, Wet snow—slow breaking, Black ice or thin ice patches—high caution and slow, Treacherous (7 degrees of separation and use of MRMFC3, RTFC4 and RTBC 5 camera systems).
  f. Vehicle speed: Below 25 mph, 26-40 mph, 41-60 mph, 65-75 mph, Above 75 mph (5 degrees of separation and use of vehicle speedometer feedback and/or MRMFC3 and RTFC3 camera systems).

In addition, the MRMFC3, RTFC4, and RTBC5 camera systems can track potential hazards that may not be readily visible to the driver. These include animal or vehicle debris on the road; single or multiple emergency vehicles approaching from the rear or from some other direction; fast, aggressive, or erratic drivers; vehicles driving wrong way; or other possible hazards not readily visible due to fog, haze, or other visibility inhibitors. The system would recognize wrong-way driving by recognizing "WRONG WAY" road signs as well as traffic lights facing the opposite direction and the broad side of cars in parking garages and lots.

The Road Hazards Identification and Warning Algorithm (RHIW ALG) (see FIGS. 9A and 9B) preferably matches the camera information with the driver profile to identify possible dangers and warn the driver through visual, audio, or physical means, and possibly initiate corrective vehicle action on its own. This may include fast, aggressive drivers in the vicinity of the vehicle.

Figure 10:
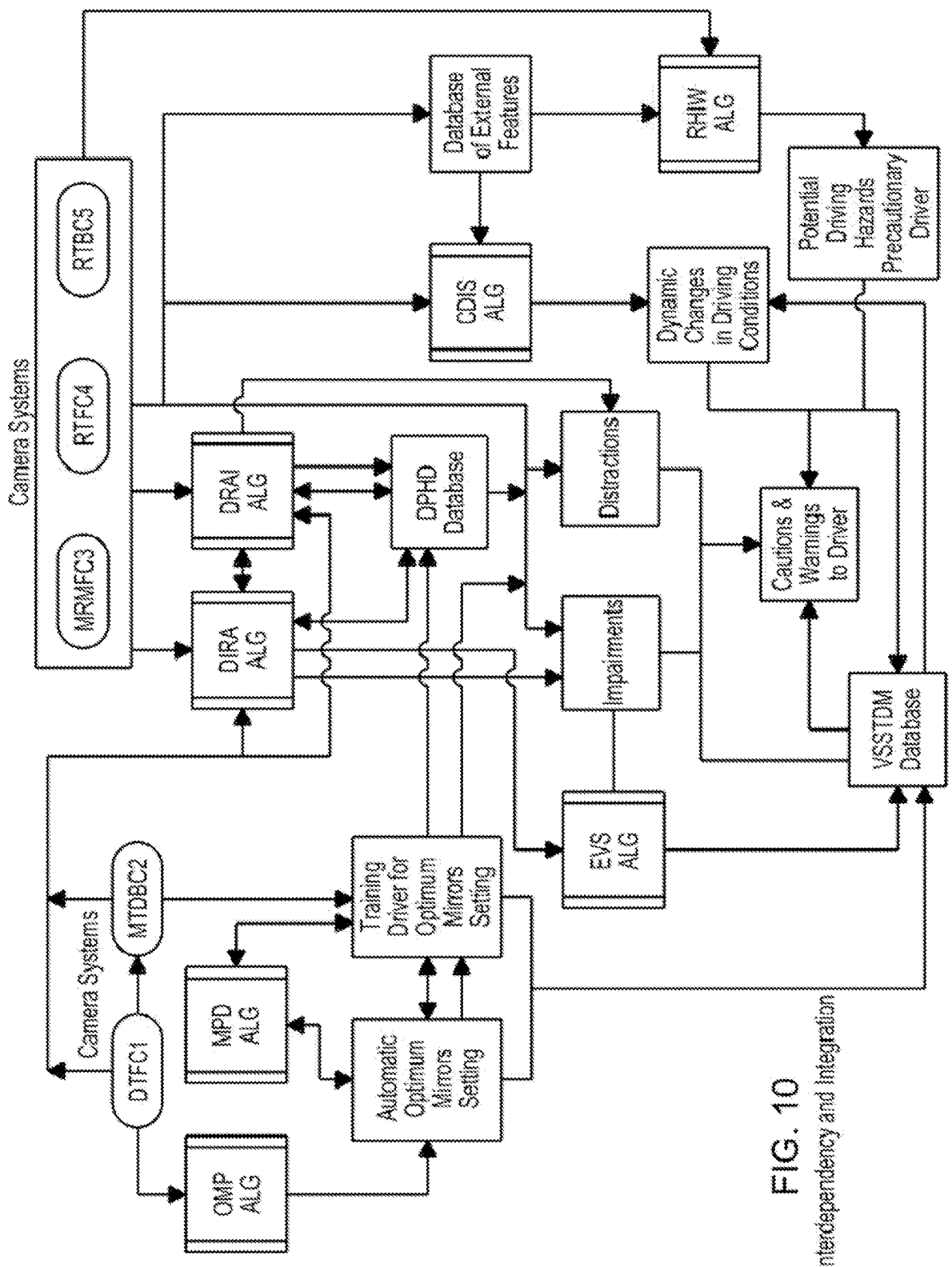
FIG. 10 is a block diagram representing a possible embodiment of the structure of the relationships between functions, algorithms, and informational (camera) systems suitable for use in a dynamic driving assistance and warning system in accordance with an embodiment of the present invention.

After detailing the camera systems, algorithms, and modules disclosed in this embodiment, FIG. 10 illustrates one possible embodiment of the relationships between these components.

Figure 11:
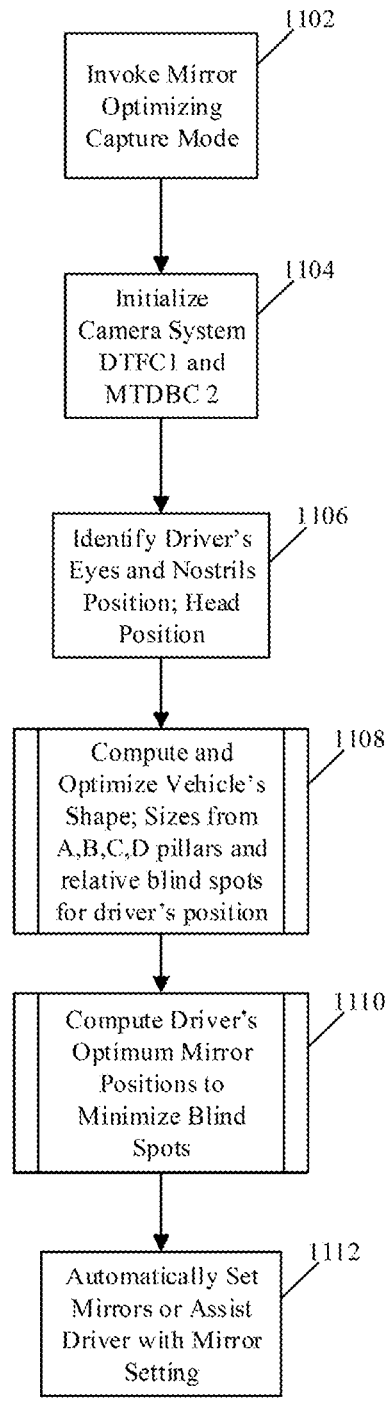
FIGS. 11 through 17 are block diagram representing further details of processing operations preferably associated with algorithms identified in FIGS. 9A and 9B.

FIGS. 11 through 17 are block diagram representing further details of processing operations preferably associated with algorithms discussed above in reference to FIGS. 9A and 9B. FIG. 11 illustrates processing operations preferably associated with the Optimum Mirrors Positioning Algorithm (OMP ALG). Initially, a mirror optimizing capture mode is invoked 1102. For example, the user (driver) may access or enable a capture mode presented on, for example, the information display screen 13 of FIG. 1, or dashboard instrumentation panel button to invoke a Mirror Optimization Capture Mode. Once the Mirror Optimization Capture Mode has been enabled, the camera systems DTFC1 and MTDBC2 1104 are enabled and are preferably used to identify the driver's eyes and nostril position and the associated head position 1106. Based on the vehicles' associated A, B, C, and/or D pillars, the relative blind spots specific to that vehicle model is computed 1108. The individualized blind spot for the specific height and body structure of the driver is also computed to optimize the mirror positions to minimize the blind spots 1110. Once the optimized location has been calculated, the mirrors (e.g., 11 and 31 in FIGS. 1 through 8) preferably are automatically set or assist the driver in the associated mirror setting 1112.

Figure 12:
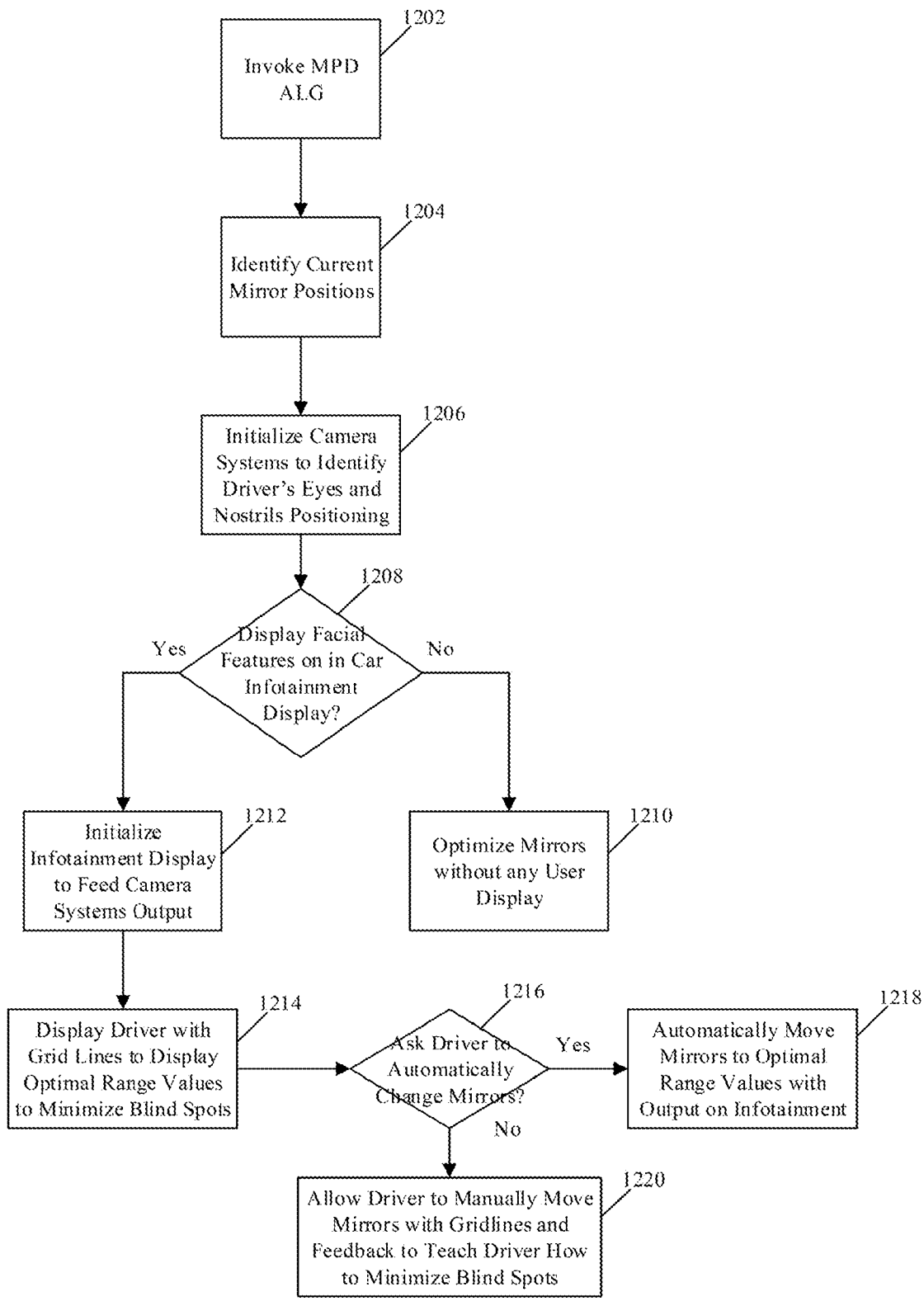

An automatic set option functionality of the type noted above in reference to FIG. 11 is described in reference to FIG. 12, which illustrates processing operations preferably associated with the Display Algorithm for the Mirrors Position (MPD ALG). When the OMP ALG is initialized and has computed the driver's optimum mirror positions to minimize blind spots 1110, the MPD ALG is invoked 1202 by the OMP ALG system and preferably goes through the processes in FIG. 11 to identify the driver's nostrils, eyes and head positioning 1206 and current mirror settings 1204. The user can choose to not display any output on the infotainment center (1208—No) and the system can optimize the mirrors 11 and 31 without any user display. If the user chooses to display his facial features on the information display screen 13 (1208—Yes), the system may initialize the screen 13 to feed the camera systems output 1212. The system may display the driver with grid lines to display optimal range values to minimize the blind spots associated with that particular vehicle model based on the user's physical positioning in the vehicle 1214. The system can either change the mirrors automatically 1218 or allow the driver the manually move the mirrors 11 and 31 with gridlines and additional feedback to teach the driver how to minimize the blind spots 1220 by optimizing all three mirrors 11 and 31.

Figure 13:
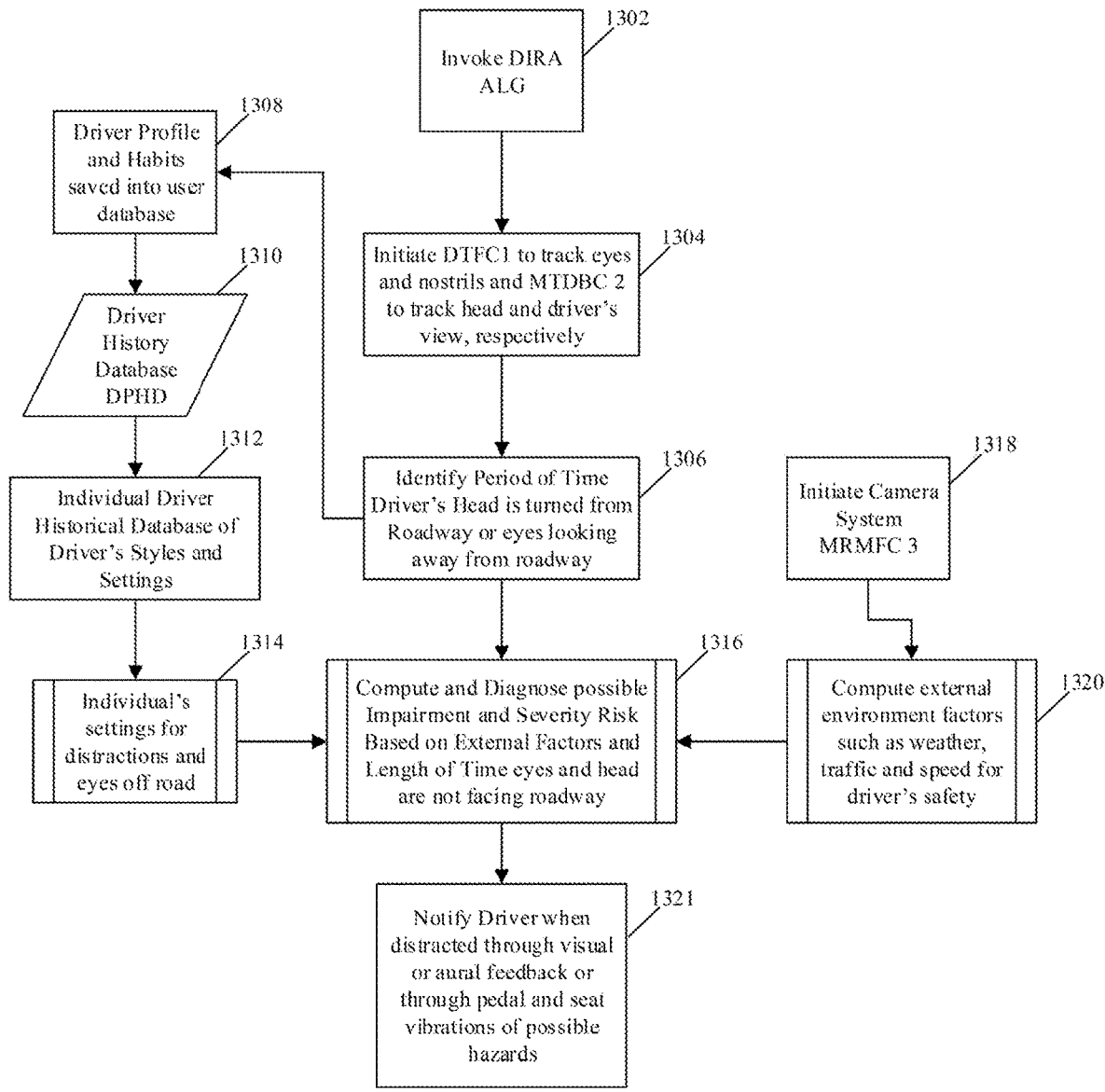

FIG. 13 illustrates processing operations preferably associated with the Driver Impairment Risk Analysis Algorithm (DIRA ALG). While the vehicle 10 is in motion, the DIRA ALG is invoked automatically 1302. The DTFC1 and MTDBC2 camera systems are initiated to track the eyes and nostrils of the driver and the head and driver's view 1304. These cameras may identify a period of time that the driver's head may be turned from the roadway or eyes looking away from the roadway 1306 as if they are impaired from medical or other unforeseen occurrences. This scenario can be from any possible driver incapacity, for example, from various health conditions like cardiac arrest, diabetic low glycaemia events, or strokes. This information is placed into a driver profile 1308 and habits to form pattern classification for the individual user and their specific habits and distraction behaviors into a driver history database DPHD 1310. These historical individualized driver's styles, settings, and habits 1312 are then used to compute their individualized settings for distraction on a roadway 1314 for a possible impairment and severity risk classification 1316 based on external factors, for example, weather, traffic and speed 1320 that is captured from MRMFC3 camera system 1318. The risk classification based upon the severity is used to notify the distracted driver through visual or aural feedback or through physical vibrations or other safety protocols that may be integrated into the pedals and/or seat to warn the driver of possible hazards. If the driver still appears to be unresponsive, the Emergency Vehicle Stoppage Algorithm may be used to take control of the vehicle and assist in stopping the vehicle 10 during an emergency.

Figure 14:
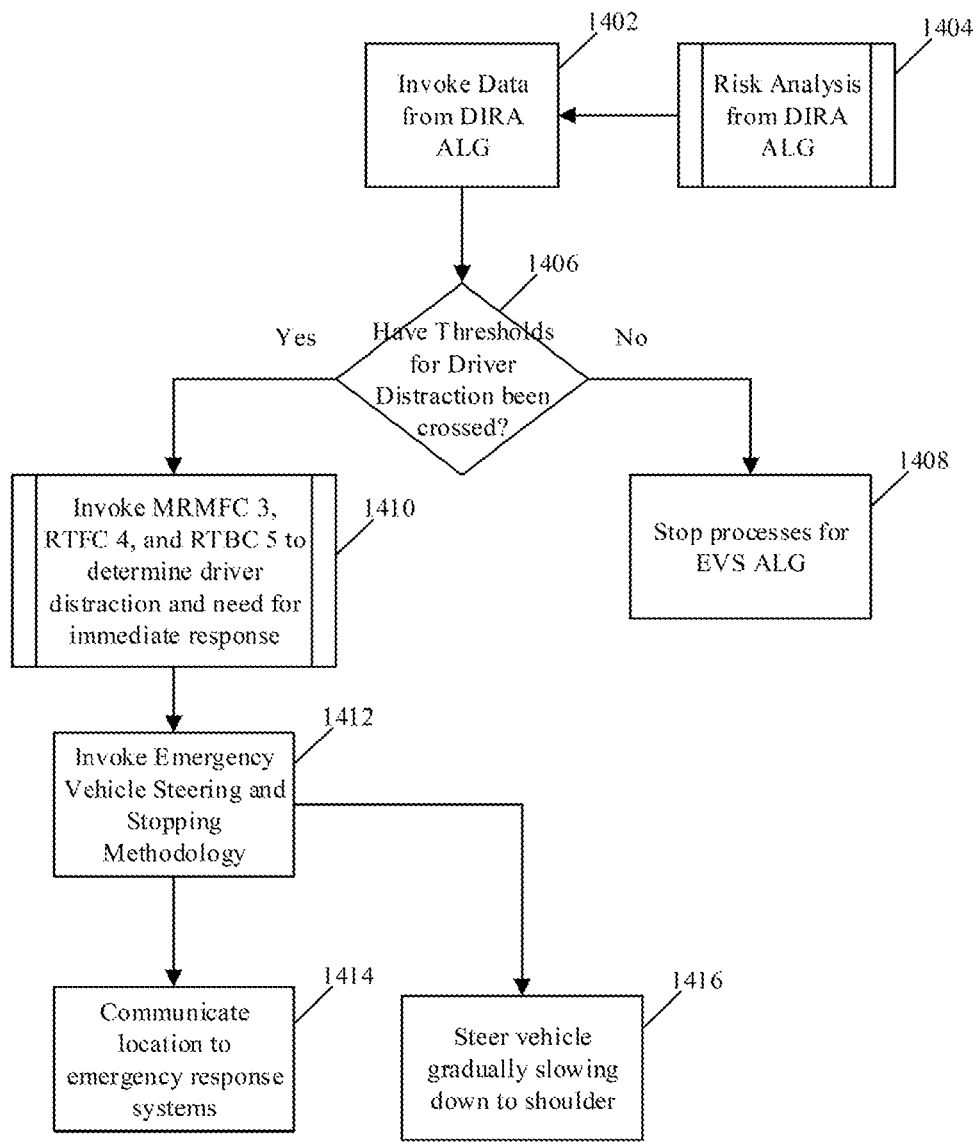

FIG. 14 illustrates processing operations preferably associated with the Emergency Vehicle Stoppage Algorithm (EVS ALG). For EVS ALG, if risk analysis 1316/1404 and data from the DIRA ALG 1402 has crossed driver distraction thresholds (1406—Yes), the MRMFC3, RTRF 4, and RTBC5 camera systems are preferably initialized to determine the driver's distraction and need for immediate response. This scenario can be from any possible driver incapacity, for example, from various health conditions like cardiac arrest, diabetic low glycaemia events, or strokes. Once the system has determined the need for immediate response, the vehicle's safety protocol is initiated to take emergency vehicle steering and stopping methodologies 1412 to steer the vehicle gradually to shoulder 1416 while communicating the vehicle's location and emergency need to the emergency response systems 1414.

Figure 15:
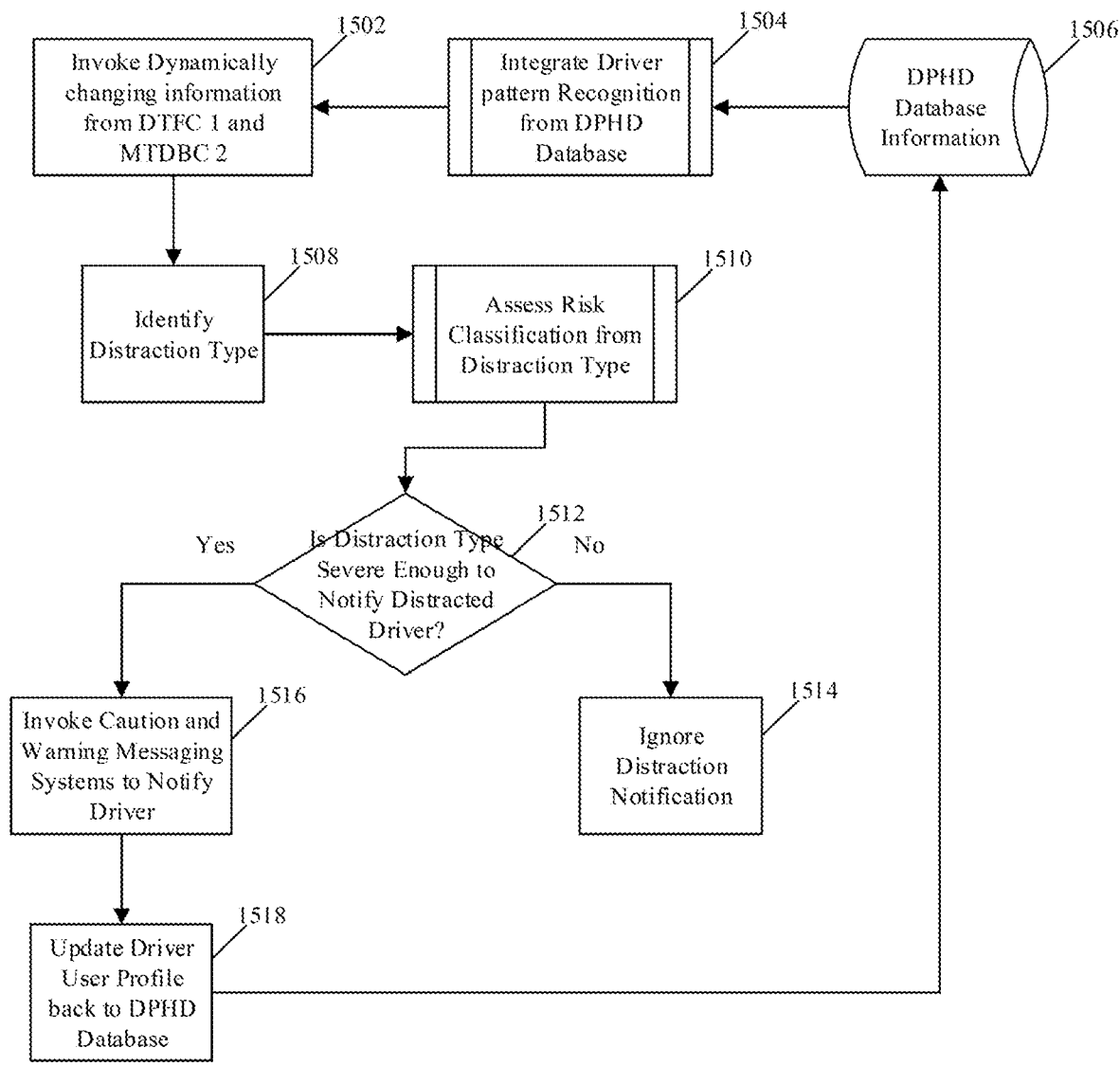

FIG. 15 illustrates processing operations preferably associated with the Distraction Risk Analysis and Intervention Algorithm (DRAI ALG). The DTFC 1 and MTDBC2 camera systems are initialized 1502 once the vehicle 10 is in motion. The camera systems are preferably used to identify distraction type 1508 and a risk classification 1510 based upon the duration the driver has been distracted and environmental considerations, for example, traffic density, weather, and vehicle speed. Based upon this risk classification, the system preferably determines if the distraction type is severe enough to notify the distracted driver. This distraction can be common distractions, for example, mobile phone usage, eating food, drinking or handling beverages, common tasks such as putting on makeup or shaving, or reaching for any items inside the vehicle 10 that may take the driver's attention off the roadway. If the distraction is not severe enough (1512—No), the system may ignore the distraction notification 1514. If the distraction is severe (1512—Yes), the vehicle 10 may initiate the caution and warning messaging systems to notify the driver of being distraction 1518. The data based upon the length of time the driver was distracted and their type of distraction patterns are put into a user profile 1518 and sent back to the DPHD database 1508 to update their user historical pattern.

Figure 16:
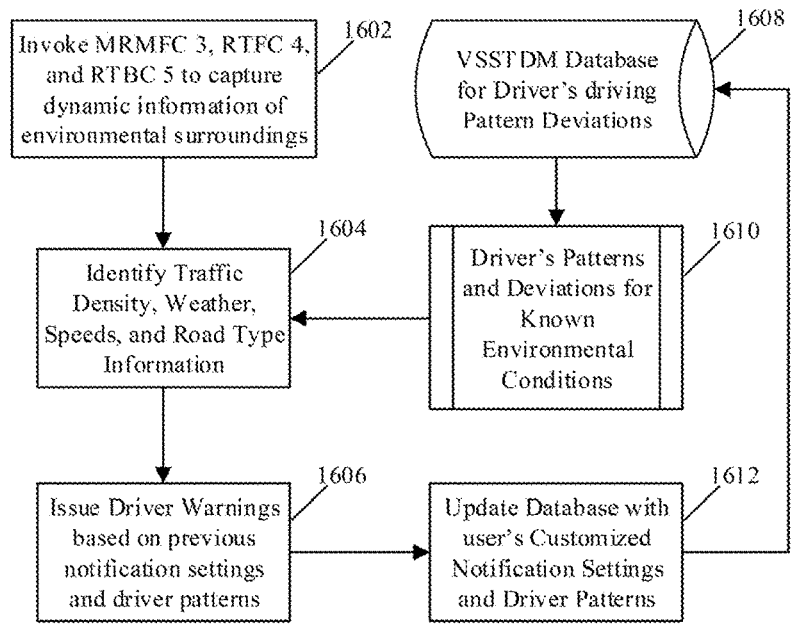

FIG. 16 illustrates processing operations preferably associated with the Customized Dynamic Interactive Safety Algorithm (CD IS ALG). In this system, the MRMFC3, RTFC4, and RTBC5 camera systems are preferably used to capture dynamic information of the environmental surroundings from the vehicle 1604 that can include environmental changes, for example, traffic density, weather, traveling speeds or road type information 1604. The Vehicle Specific Safe Thresholds and Driver Messages Generator (VSSTDM) database 1608 may contain data and pattern recognition processes of the driver's individualized deviations and patterns for their unique driving styles and reaction capabilities for environmental conditions 1601. Based upon the user's tendencies, the vehicle's warning systems may notify the driver based upon his/her driving styles, patterns and settings for warning notifications 1606. After warnings and other notification setting updates the database may be updated with newest information on driver response and driver response time 1612.

Figure 17:
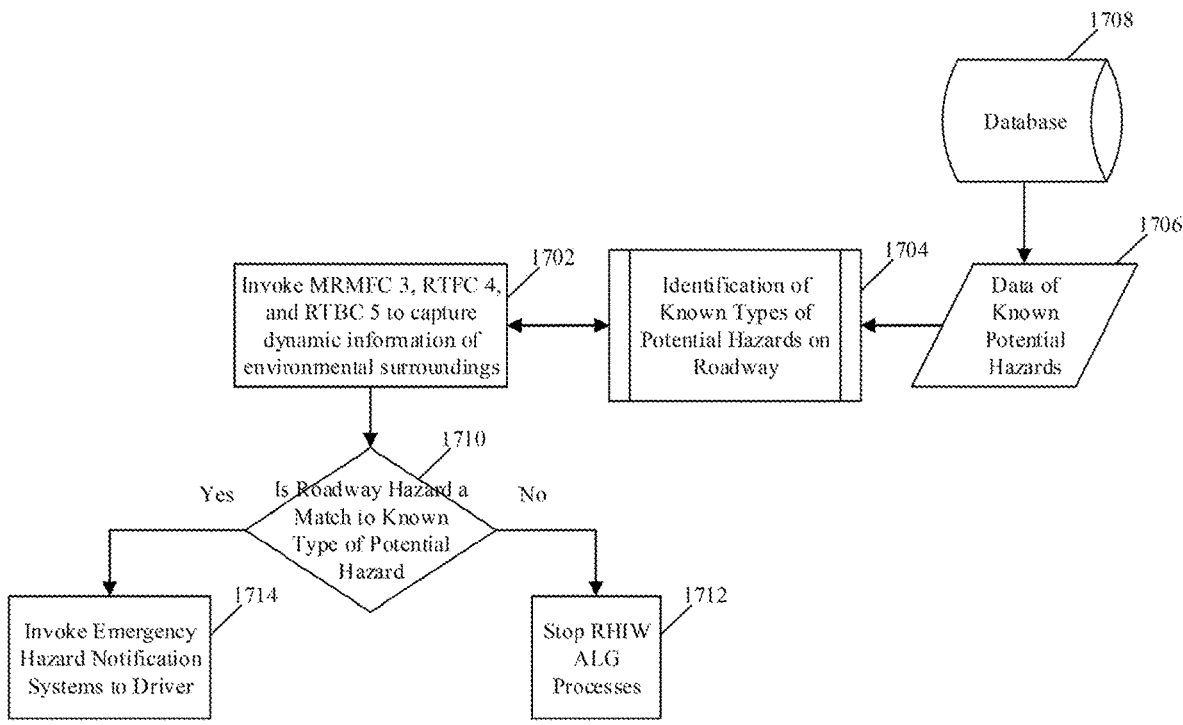

FIG. 17 illustrates processing operations preferably associated with the Road Hazard Identification and Warning Algorithm (RHIW ALG). While the vehicle 10 is in motion, the MRMFC3, RTFC4, and RTBC5 camera systems are initialized to capture dynamic information of environmental surroundings 1702. A known database 1708 containing data of known potential hazards 1706, for example, pedestrians, animals, and roadway debris, are preferably used for image processing and identification of known types of potential hazards 1704. If the hazard identified on the roadway does not match any potential hazards (1702—No), the RHIW ALG processes may terminate. If the hazard identified on the roadway matches the database of known potential hazards (1710—Yes), then the vehicle emergency hazard notification systems may be initialized to alert the driver of possible hazard 1714.

It should be appreciated that systems utilizing any one or more of the camera subsystems and algorithms could find use in both personal and commercial transportation vehicles, which can be manufactured with such a system as original equipment or as an aftermarket feature. With particular respect to the mirror adjustment capability, such a feature is not only capable of increasing the likelihood that the rear and sideview mirrors of a vehicle will be appropriately adjusted for the particular driver, but can also compensate for difficulties encountered when trying to adjust the mirrors under poor outside conditions, for example, darkness or inclement weather. In addition to privately owned vehicles, rental car companies can make use of a driving assistance system that includes the mirror adjustment capability to ensure that each operator has such a feature available to them. Finally, information relating to the driver profile and behavior can not only find private uses by the driver, but commercial uses by others, including the insurer of the vehicle.

While the invention has been described in terms of specific or preferred embodiments, it is apparent that other forms could be adopted by one skilled in the art. For example, the functions of each component of the system could be performed by various components capable of a similar (though not necessarily equivalent) function. Accordingly, it should be understood that the invention is not limited to the specific embodiments described or illustrated in the Figures. It should also be understood that the phraseology and terminology employed above are for the purpose of disclosing the illustrated embodiments, and do not necessarily serve as limitations to the scope of the invention. Therefore, the scope of the invention is to be limited only by the following claims.

The invention claimed is:

1. A system for improving safety during operation of a vehicle having a passenger compartment configured to be occupied by at least one driver of the vehicle, the system comprising:
 a data collection system that constantly observes internal and external driving conditions of the vehicle during operation of the vehicle by a driver and collects data corresponding thereto, wherein the internal driving conditions include fatigue, impairment based on at least observations of eyes of the driver, and voluntary and non-voluntary distraction of the driver based on at least observations of the eyes and nose of the driver, and the external driving conditions include time of day, weather, and traffic conditions;
 a processing system that utilizes algorithms to create a history database of the collected data, process the collected data to develop a driver profile of driving characteristics of the driver under the internal and external driving conditions, determine safety thresholds for the driver from the history database and the driver profile when operating the vehicle under the internal and external driving conditions, compare the driver profile to a current performance of the driver when the driver is operating the vehicle under current internal and external driving conditions, perform a driver impairment risk analysis and a driver distractions risk analysis under the current internal driving conditions, determine potential risks and/or hazards for the driver based on the safety thresholds and the comparison of the driver profile to the current performance of the driver, and discern a distinction between impairment and distraction of the driver when the driver is operating the vehicle under the current internal and external driving conditions; and
 a relay system that utilizes the history database to relay the potential risks and/or hazards to the driver of the vehicle through physical, audio and/or visual alerts when the driver is operating the vehicle while any of the internal and external driving conditions exist, so as to improve the driver's ability to avoid obstacles and potential dangers and to enhance the driver's natural driving performance when the driver is operating the vehicle while any of the internal and external driving conditions exist.

2. The system according to claim 1, wherein the data collection system comprises camera subsystems comprising:
 a first camera subsystem that collects data regarding the driver's facial, body, and eye movements;
 a second camera subsystem that collects data corresponding to the driver's rearview of the vehicle and coordinates and improves rearview capabilities of the driver;
 a third camera subsystem that collects image data corresponding to images displayed on rear and sideview mirrors of the vehicle and collects data corresponding to orientations of the rear and sideview mirrors to the driver;
 a fourth camera subsystem for visually capturing objects in front of the vehicle and collecting image data corresponding thereto; and
 a fifth camera subsystem for visually capturing objects in the rear of the vehicle and collecting image data corresponding thereto.

3. The system according to claim 2, wherein the processing system comprises subsystems comprising:
 a first subsystem of algorithms that analyzes the data and the image data collected by the first, second and third camera subsystems and compiles the history database therefrom;
 a second subsystem of algorithms that analyzes the history database to construct the driver profile comprising driving characteristics and skill characteristics of the driver and establishes therefrom the safety thresholds for the driver's operation of the vehicle;
 a third subsystem of algorithms that compares the current internal and external driving conditions to the internal and external driving conditions stored in the history database and to the safety thresholds and determines if there is an immediate risk and/or hazard based thereon; and
 a fourth subsystem of algorithms that assesses the image data collected by the fourth and fifth camera subsystems to determine if there is an immediate danger.

4. The system according to claim 2, wherein the camera subsystems comprise multiple camera and data collection technologies that comprise distance-measuring camera techniques.

5. The system according to claim 2, wherein the camera subsystems are capable of collecting the data and the image data in adverse conditions including low-visibility weather, extreme temperatures, and low-light settings.

6. The system according to claim 2, wherein the camera subsystems of the data collection system and the algorithms of the subsystems of the processing system distinguish between risks and background information to only relay the potential risks and/or hazards to the driver.

7. The system according to claim 2, wherein the processing system is adapted to adjust the rear and sideview mirrors for the driver based on the data and the image data collected by the camera subsystems.

8. The system according to claim 1, wherein the internal driving conditions further include driving characteristics and skill characteristics of the driver and the processing system further utilizes algorithms for pattern recognition to further determine the safety thresholds of the driver that take into consideration the driver's individualized deviations, performance and patterns for the driver's driving style and reaction capabilities under the current internal and external driving conditions.

9. The system according to claim 1, wherein the relay system warns the driver of both immediate dangers and potential inconsistencies in driving behavior based on the history database.

10. The system according to claim 1, wherein the system includes a graphic user interface and means for displaying information collected from the system on the graphic user interface.

11. The system according to claim 1, wherein the data collection system includes an interior microphone to collect auditory data from the driver and/or the passenger compartment of the vehicle.

12. The system according to claim 1, wherein the system further comprises means for controlling the vehicle to perform corrective maneuvers, including speed or steering adjustments, in the event of driver inability based on the history database.

13. The system according to claim 1, wherein the vehicle is a commercial transportation vehicle or a passenger vehicle.

14. A method for improving safety during operation of a vehicle having a passenger compartment occupied by a driver of the vehicle, the method comprising:
constantly observing internal and external driving conditions of the vehicle during operation of the vehicle by a driver and collecting data corresponding thereto, wherein the internal driving conditions include fatigue, impairment based on at least observations of eyes of the driver, and voluntary and non-voluntary distraction of the driver based on at least observations of the eyes and nose of the driver, and the external driving conditions include time of day, weather, and traffic conditions;
processing the collected data utilizing algorithms to create a history database of the collected data, process the collected data to develop a driver profile of driving characteristics of the driver under the internal and external driving conditions, determine safety thresholds for the driver from the history database and the driver profile when operating the vehicle under the internal and external driving conditions, compare the driver profile to a current performance of the driver when the driver is operating the vehicle under current internal and external driving conditions, perform a driver impairment risk analysis and a driver distractions risk analysis under the current internal driving conditions, determine potential risks and/or hazards for the driver based on the safety thresholds and the comparison of the driver profile to the current performance of the driver, and discern a distinction between impairment and distraction of the driver when the driver is operating the vehicle under the current internal and external driving conditions; and
warning the driver of the potential risks and/or hazards determined from the collected data.

15. The method according to claim 14, wherein the driver distractions risk analysis determines driver distraction by sensing changes in the driver's pupils to determine if and for how long the driver's focus is away from a road on which the vehicle is traveling.

16. The method according to claim 14, wherein the driver impairment risk analysis determines the impairment of the driver by sensing movement of the driver's eyes.

17. The method according to claim 14, wherein the method does not replace the driver but instead captures patterns of the driver based on the history database and works in coordination with these patterns to improve the driver's ability to avoid obstacles and potential dangers and to enhance the driver's natural driving performance.

18. The method according to claim 14, further comprising conveying the driver profile to an insurance company as indicative of driving behavior of the driver.

19. The method according to claim 14, wherein the vehicle is a personal or commercial transportation vehicle.

20. A system performing the method of claim 14.

* * * * *